(12) United States Patent
Okamura

(10) Patent No.: US 7,786,233 B2
(45) Date of Patent: Aug. 31, 2010

(54) POLYVINYLPYRROLIDONE POWDER COMPOSITIONS

(75) Inventor: Kazuhiro Okamura, Sanda (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 12/010,505

(22) Filed: Jan. 25, 2008

(65) Prior Publication Data

US 2008/0182955 A1 Jul. 31, 2008

(30) Foreign Application Priority Data

Jan. 26, 2007 (JP) ............................. 2007-016958

(51) Int. Cl.
*C08F 26/10* (2006.01)
(52) U.S. Cl. .................. 526/264; 526/213; 526/217
(58) Field of Classification Search ............. 526/213, 526/217, 264; 525/326.9, 379, 384, 386
See application file for complete search history.

(56) References Cited

U.S. PATENT DOCUMENTS

| | | | | |
|---|---|---|---|---|
| 3,674,859 | A * | 7/1972 | Beutel et al. ............... | 514/152 |
| 6,187,884 | B1 | 2/2001 | Kothrade et al. | |
| 6,346,600 | B1 | 2/2002 | Tomihisa et al. | |
| 6,436,440 | B1 * | 8/2002 | Meffert et al. ............. | 424/486 |
| 6,498,231 | B2 * | 12/2002 | Tomihisa et al. ........... | 528/501 |
| 6,617,420 | B2 * | 9/2003 | Kuriyama et al. .......... | 528/480 |
| 6,773,591 | B2 | 8/2004 | Boivin et al. | |
| 2006/0216263 | A1 * | 9/2006 | Miyai et al. ............... | 424/70.15 |
| 2007/0238818 | A1 * | 10/2007 | Miyai et al. ................ | 524/236 |

FOREIGN PATENT DOCUMENTS

| | | |
|---|---|---|
| CA | 2184837 | 3/1997 |
| CN | 1271739 | 11/2000 |
| EP | 0 761 699 | 3/1997 |
| EP | 0 887 360 | 12/1998 |
| JP | 61-93801 | 5/1986 |
| JP | 7-278948 | 10/1995 |
| JP | 10-121324 | 5/1998 |
| JP | 2002-239348 | 8/2002 |
| JP | 2003-245524 | 9/2003 |
| JP | 2006-239576 | 9/2006 |

OTHER PUBLICATIONS

Partial European Search Report issued Apr. 28, 2008 in EP Application No. 08 00 1338 corresponding to the present application.
Chinese Office Action issued Feb. 5, 2010 in connection with corresponding Chinese Application No. 200810002799.2, with English translation.

* cited by examiner

*Primary Examiner*—Helen L. Pezzuto
(74) *Attorney, Agent, or Firm*—Wenderoth, Lind & Ponack, L.L.P.

(57) ABSTRACT

A polyvinylpyrrolidone powder composition including polyvinylpyrrolidone with a K value of not lower than 50 and not higher than 120, wherein a content of insoluble substances remaining on a membrane filter having a pore size of 1.2 μm when a 2 wt % aqueous solution of the composition is filtered with the filter is not higher than 70 ppm; a polyvinylpyrrolidone powder composition including polyvinylpyrrolidone with a K value of not lower than 50 and not higher than 120, wherein a K value lowering ratio to be observed when the composition is heated at 80° C. in air for 14 days is not higher than 12%; and a polyvinylpyrrolidone powder composition including polyvinylpyrrolidone with a K value of not lower than 50 and not higher than 120, wherein a content of insoluble substances remaining on a membrane filter having a pore size of 1.2 μm when a 2 wt % aqueous solution of the composition is filtered with the filter is not higher than 70 ppm, and a K value lowering ratio to be observed when the composition is heated at 80° C. in air for 14 days is not higher than 12%.

7 Claims, No Drawings

POLYVINYLPYRROLIDONE POWDER COMPOSITIONS

BACKGROUND OF THE INVENTION

1. Field of the Invention

The present invention relates to polyvinylpyrrolidone powder compositions.

2. Description of the Related Art

Polyvinylpyrrolidone is widely used as a safe functional polymer in the form of a powder or an aqueous solution in various fields for applications such as cosmetics, intermediates of agricultural and medical products, food additives, photosensitive electronic materials, and tackifiers, or for various special industrial applications. In particular, a polyvinylpyrrolidone powder is widely used as a viscosity modifier for a raw material solution at the time of producing a hollow fiber membrane, or as a minute hole forming agent for a hollow fiber membrane. For example, Japanese Patent Laid-open Publication Nos. H10-121324, 2002-239348, 2003-245524, and 2006-239576 disclose processes for producing a hollow fiber membrane by extruding a raw material solution containing polysulfone or polyethersulfone as a membrane forming polymer and polyvinylpyrrolidone as a hydrophilic polymer from a spinneret, immersing the extruded raw material solution in a solidifying bath mainly containing water for solidification, and winding up the solidified hollow fiber membrane.

However, the conventional polyvinylpyrrolidone powder contains a great amount of insoluble substances such as gelled substances and impurities. The insoluble substances contained in a great amount in a polyvinylpyrrolidone powder gives rise to, for example, defect products in the production of a hollow fiber membrane or deterioration in filtration performance of the obtained hollow fiber membrane. Currently, for avoiding these problems, insoluble substances are removed by filtrating a raw material solution at the time of producing a hollow fiber membrane; however, if the content of insoluble substances is high, there is a problem that replacement frequency of the filter is made higher to drastically deteriorate the productivity. For example, Japanese Patent Laid-open Publication No. H10-121324 teaches completely removing undissolved particles by filtrating a raw material solution before extrusion from a spinneret (see, in particular, paragraph [0027]).

Moreover, due to its poor thermal stability, if the conventional polyvinylpyrrolidone powder is left in air, the K value is gradually lowered. If the K value differs depending on the storage period from the purchase to the use of a polyvinylpyrrolidone powder, partly because of the instable quality of a raw material, a product having stable filtration performance cannot be obtained at the time of producing a hollow fiber membrane. For this reason, at the time of producing a hollow fiber membrane, the K value is adjusted by carrying out a heat treatment or the like.

SUMMARY OF THE INVENTION

Under the above-described circumstances, an object of the present invention is to provide polyvinylpyrrolidone powder compositions each having a low content of insoluble substances and/or fine thermal stability.

The present inventors have made various studies and, as a result, they have found that polyvinylpyrrolidone powder compositions having a low content of insoluble substances and/or fine thermal stability can be obtained by carrying out one or more prescribed operations at the time of producing a polyvinylpyrrolidone powder composition by polymerizing N-vinylpyrrolidone, specifically, by (1) adjusting the pH of a polymerization solution using a secondary amine before, during, and/or after the polymerization, (2) carrying out a filtration operation after completion of the polymerization and drying by means of a heating surface adhesion-type drying method, a freeze drying method, or a vacuum drying method, (3) drying by means of a freeze drying method or a vacuum drying method after completion of the polymerization while maintaining the internal temperature at 50° C. or lower by dropping polymerization using a polymerization initiator usable at low temperatures, and/or (4) adding an antioxidant to the polymerization solution before, during, and/or after the polymerization, thereby completing the present invention.

Thus, the present invention provides a polyvinylpyrrolidone powder composition comprising polyvinylpyrrolidone with a K value of not lower than 50 and not higher than 120, wherein a content of insoluble substances remaining on a membrane filter having a pore size of 1.2 µm when a 2 wt % aqueous solution of the composition is filtered with the filter is not higher than 70 ppm. The "membrane filter" as used herein is a general term for chemical resistant filter papers represented by the order number 11803-50-N (a PTFE filter) available from Sartorius AG.

Moreover, the present invention provides a polyvinylpyrrolidone powder composition comprising polyvinylpyrrolidone with a K value of not lower than 50 and not higher than 120, wherein a K value lowering ratio to be observed when the composition is heated at 80° C. in air for 14 days is not higher than 12%.

Furthermore, the present invention provides a polyvinylpyrrolidone powder composition comprising polyvinylpyrrolidone with a K value of not lower than 50 and not higher than 120, wherein a content of insoluble substances remaining on a membrane filter having a pore size of 1.2 µm when a 2 wt % aqueous solution of the composition is filtered with the filter is not higher than 70 ppm, and a K value lowering ratio to be observed when the composition is heated at 80° C. in air for 14 days is not higher than 12%.

The polyvinylpyrrolidone powder compositions of the present invention may further contain a secondary amine or a salt thereof, and/or an antioxidant.

The polyvinylpyrrolidone powder compositions of the present invention each have a low content of insoluble substances and/or fine thermal stability. Therefore, at the time of producing a hollow fiber membrane or a membrane filter, the filtration speed of a raw material solution can be improved, and furthermore, a product with stable filtration performance can be obtained using a raw material of the constant quality.

DETAILED DESCRIPTION OF THE INVENTION

<<Polyvinylpyrrolidone Powder Composition>>

The polyvinylpyrrolidone powder composition of the present invention is, in the first aspect, a powder composition comprising polyvinylpyrrolidone with a K value of not lower than 50 and not higher than 120, wherein a content of insoluble substances remaining on a membrane filter having a pore size of 1.2 µm when a 2 wt % aqueous solution of the composition is filtered with the filter is not higher than 70 ppm.

The "insoluble substances" as used herein means a gelled substance of polyvinylpyrrolidone or solid impurities present from the production stage of polyvinylpyrrolidone. Moreover, the "content of insoluble substances" as used herein is a value obtained by dividing the dry mass of insoluble substances remaining on a membrane filter having a pore size of 1.2 μm when a 2 wt % aqueous solution of a polyvinylpyrrolidone powder composition is filtered with the filter by the mass of the composition used at the time of preparing the 2 wt % aqueous solution of the composition and representing the quotient in terms of ppm unit.

If the content of insoluble substances is higher than 70 ppm, for example, in the case where the polyvinylpyrrolidone powder composition is used for the production of a hollow fiber membrane or a membrane filter, productivity may be lowered due to a long time necessary for filtering a raw material solution. That is, for example, at the time of industrially producing a hollow fiber membrane or a membrane filter using the polyvinylpyrrolidone powder composition of the present invention, if the content of insoluble substances is not higher than 70 ppm, since a raw material solution can rapidly be filtered, productivity can be improved. In other words, the content of insoluble substances which is not higher than 70 ppm is an essential condition for producing a hollow fiber membrane or a membrane filter industrially with good productivity using a polyvinylpyrrolidone powder composition.

The content of insoluble substances may usually be not higher than 70 ppm, preferably not higher than 60 ppm, and more preferably not higher than 50 ppm. Moreover, although the lower limit of the content of insoluble substances is not particularly limited, it may preferably be 0 ppm.

The polyvinylpyrrolidone powder composition of the present invention is, in the second aspect, a powder composition comprising polyvinylpyrrolidone with a K value of not lower than 50 and not higher than 120, wherein a K value lowering ratio to be observed when the composition is heated at 80° C. in air for 14 days is not higher than 12%.

The "K value lowering ratio" as used herein means the value calculated by the following formula:

K value lowering ratio (%)=[(K value before heating–K value after heating at 80° C. for 14 days)/K value before heating]×100 wherein the K value before heating denotes the K value determined before heating a sample, and the K value after heating at 80° C. for 14 days denotes the K value determined after heating the sample at 80° C. in air for 14 days. With respect to the K value lowering ratio, a higher value shows a further lowering of the molecular weight.

If the K value lowering ratio is higher than 12%, for example, in the case where the polyvinylpyrrolidone powder composition is used for the production of a hollow fiber membrane or a membrane filter, a product with stable filtration performance cannot be obtained due to the inconstant quality of a raw material. That is, for example, at the time of industrially producing a hollow fiber membrane or a membrane filter using the polyvinylpyrrolidone powder composition of the present invention, if the K value lowering ratio is not higher than 12%, since the thermal stability is high and the K value is not fluctuated depending on the storage period from the purchase to the use, the quality of a raw material can be made constant, and thus a product with stable filtration performance can be obtained. In other words, a K value lowering ratio of not higher than 12% is an essential condition for industrially producing a high quality hollow fiber membrane or a membrane filter using a polyvinylpyrrolidone powder composition.

The K value lowering ratio may usually be not higher than 12%, preferably not higher than 11%, and more preferably not higher than 10%. Moreover, although the lower limit of the K value lowering ratio is not particularly limited, it may preferably be 0%.

The polyvinylpyrrolidone powder composition of the present invention is, in the third aspect, a powder composition comprising polyvinylpyrrolidone with a K value of not lower than 50 and not higher than 120, wherein a content of insoluble substances remaining on a membrane filter having a pore size of 1.2 μm when a 2 wt % aqueous solution of the composition is filtered with the filter is not higher than 70 ppm, and a K value lowering ratio to be observed when the composition is heated at 80° C. in air for 14 days is not higher than 12%.

The "polyvinylpyrrolidone powder composition" as used herein is not limited to a powder of polyvinylpyrrolidone, but it means a composition comprising a solid substance of polyvinylpyrrolidone in wide sense. The "solid substance" as used herein may preferably be a powder of polyvinylpyrrolidone, but it may have a particle-like, granular, spherical, lumpy, or scale-like shape. The size of particles or the like forming the solid substance may appropriately be adjusted according to the application of the composition, or the like, and thus, it is not particularly limited, but the particles or the like may preferably have an average particle diameter of from 10 to 3,000 μm, more preferably from 50 to 1,000 μm, and still more preferably from 80 to 800 μm, from the viewpoints of workability and solubility. The "average particle diameter" as used herein is a numerical value determined by the method described in Examples below.

Moreover, the "K value" as used herein is a numerical value usually used as the scale of a molecular weight in the case of polyvinylpyrrolidone. Specifically, it is a numerical value obtained by measuring the relative viscosity of a 1 wt % aqueous solution of polyvinylpyrrolidone at 25° C. with a capillary viscometer, putting the relative viscosity in the following Fikentscher's viscosity formula:

$$\log_{10} \eta_{rel} = [75k_0^2/(1+1.5k_0c) + k_0] \times c$$

wherein $\eta_{rel}$ is the relative viscosity, c is the concentration of the aqueous solution (g/100 mL), i.e., the g number of polyvinylpyrrolidone contained in 100 mL of the aqueous solution, and $k_0$ is a variable related to the K value, and multiplying the obtained $k_0$ value by 1,000 (in the following, this method for obtaining the K value may be referred to the Fikentscher's method). A higher K value shows a higher molecular weight.

Furthermore, the "polyvinylpyrrolidone" as used herein means a homopolymer of N-vinyl-2-pyrrolidone, of which molecular weight, as represented by the K value determined by the above-described Fikentscher's method, is not lower than 50 and not higher than 120, preferably not lower than 55 and not higher than 110, and more preferably not lower than 60 and not higher than 100.

Polyvinylpyrrolidone is obtained by polymerizing a N-vinyl-2-pyrrolidone monomer by any of the conventional methods. A method of polymerization using an azo compound and/or an organic peroxide as the polymerization initiator in an aqueous medium may particularly be preferred. According to such a method, polyvinylpyrrolidone can be obtained in the form of an aqueous solution. Polyvinylpyrrolidone can be obtained in the form of a solid substance by drying the aqueous solution containing polyvinylpyrrolidone obtained by polymerization, and if necessary, pulverizing the dried polyvinylpyrrolidone.

The polyvinylpyrrolidone powder composition of the present invention can be obtained by carrying out a predetermined operation at the time of producing polyvinylpyrrolidone by polymerizing a N-vinyl-2-pyrrolidone monomer, specifically, by (1) adjusting the pH of a polymerization solution using a secondary amine before, during, and/or after the polymerization, (2) carrying out a filtration operation after completion of the polymerization and drying by means of a heating surface adhesion-type drying method, a freeze drying method, or a vacuum drying method, (3) drying by means of a freeze drying method or a vacuum drying method after completion of the polymerization while maintaining the internal temperature at 50° C. or lower by dropping polymerization using a polymerization initiator usable at low temperatures, and/or (4) adding an antioxidant to the polymerization solution before, during, and/or after the polymerization. The polyvinylpyrrolidone powder composition of the present invention may contain a secondary amine or a salt thereof, in addition to the polyvinylpyrrolidone, in the case where a secondary amine is used for the pH adjustment of the polymerization solution. Moreover, the polyvinylpyrrolidone powder composition of the present invention may contain an antioxidant, in addition to the polyvinylpyrrolidone, in the case where an antioxidant is added to the polymerization solution. The production method for the polyvinylpyrrolidone powder composition of the present invention will be explained below in detail.

<<Applications of Polyvinylpyrrolidone Powder Compositions>>

The polyvinylpyrrolidone powder compositions of the present invention may be used for applications such as cosmetics, intermediates of agricultural and medical products, food additives, photosensitive electronic materials, and tackifiers, or for various special industrial applications (such as production of a hollow fiber membrane or a membrane filter) as it is, in a diluted or condensed form when it is dissolved in water to make an aqueous solution, or furthermore, in the form of a solid substance by drying. Since the polyvinylpyrrolidone powder compositions of the present invention have a low content of insoluble substances and/or fine thermal stability, they may be preferred, in particular, for the production of a hollow fiber membrane or a membrane filter.

<<Production Method for Polyvinylpyrrolidone Powder Compositions>>

The polyvinylpyrrolidone powder compositions of the present invention can be produced by, for example, carrying out polymerization by adding an azo compound and/or an organic peroxide as the polymerization initiator to an aqueous solution of an N-vinyl-2-pyrrolidone monomer (hereinafter referred to simply as the "monomer"), reducing the amount of residual monomer by adding an organic acid to a reaction solution after the polymerization reaction, drying an aqueous solution containing the polyvinylpyrrolidone obtained by the polymerization, and if necessary, pulverizing the dried polyvinylpyrrolidone.

However, in the present invention, (1) the pH of the polymerization solution is adjusted using a secondary amine before, during, and/or after the polymerization, (2) a filtration operation is carried out after completion of the polymerization, followed by drying by means of a heating surface adhesion-type drying method, a freeze drying method, or a vacuum drying method, (3) a drying operation is carried out by means of a freeze drying method or a vacuum drying method after completion of the polymerization while maintaining the internal temperature at 50° C. or lower by dropping polymerization using a polymerization initiator usable at low temperatures, and/or (4) an antioxidant is added to the polymerization solution before, during, and/or after the polymerization. The "polymerization solution" as used herein means an aqueous monomer solution before the polymerization and/or a reaction solution during and/or after the polymerization.

As an apparatus to be used in the heating surface adhesion-type drying method, there can be mentioned, for example, a drum rotary dryer, a belt dryer, and a disk rotary dryer. As an apparatus to be used in the freeze drying method, there can be mentioned, for example, a freeze dryer. As an apparatus to be used in the vacuum drying method, there can be mentioned, for example, a vacuum oven and a rotary evaporator.

The polyvinylpyrrolidone powder composition in the first aspect, in the polyvinylpyrrolidone powder compositions of the present invention, that is, a polyvinylpyrrolidone powder composition comprising polyvinylpyrrolidone with a K value of not lower than 50 and not higher than 120, wherein a content of insoluble substances remaining on a membrane filter having a pore size of 1.2 μm when a 2 wt % aqueous solution of the composition is filtered with the filter is not higher than 70 ppm, can be obtained by employing the above-described method (1), method (2), and/or method (3).

Moreover, the polyvinylpyrrolidone powder composition in the second aspect, in the polyvinylpyrrolidone powder compositions of the present invention, that is, a polyvinylpyrrolidone powder composition comprising polyvinylpyrrolidone with a K value of not lower than 50 and not higher than 120, wherein a K value lowering ratio to be observed when the composition is heated at 80° C. in air for 14 days is not higher than 12%, can be obtained by employing the above-described method (1) and/or method (4).

Furthermore, the polyvinylpyrrolidone powder composition in the third aspect, in the polyvinylpyrrolidone powder compositions of the present invention, that is, a polyvinylpyrrolidone powder composition comprising polyvinylpyrrolidone with a K value of not lower than 50 and not higher than 120, wherein a content of insoluble substances remaining on a membrane filter having a pore size of 1.2 μm when a 2 wt % aqueous solution of the composition is filtered with the filter is not higher than 70 ppm, and a K value lowering ratio to be observed when the composition is heated at 80° C. in air for 14 days is not higher than 12%, can be obtained by employing the above-described method (1), or employing a combination of the above-described method (1), method (2) and/or method (3) with method (4). The use of two or more methods in combination means the execution of steps characteristic to the respective methods, in addition to the steps common to these methods.

Hereinafter, each method will be explained in detail.

<Method (1)>

According to this method, the pH of the polymerization solution is adjusted using a secondary amine before, during, and/or after the polymerization.

First, in the case of adjusting the pH of the polymerization solution using a secondary amine before the polymerization, the pH is adjusted to a prescribed value by adding a secondary amine or an aqueous solution thereof to an aqueous monomer solution. With this operation, the pH of the aqueous monomer solution can be adjusted to preferably not lower than 7 and not higher than 10, more preferably not lower than 7 and not higher than 9.

As the secondary amine to be used for adjusting the pH, there can be mentioned, for example, aliphatic secondary amines such as dimethylamine, diethylamine, dipropylamine, diisopropylamine, N-methylethylamine, N-methylpropylamine, N-methylisopropylamine, N-methylbutylamine, N-methylisobutylamine, N-methylcyclohexylamine, N-ethylpropylamine, N-ethylisopropylamine, N-ethylbutylamine, N-ethylisobutylamine, N-ethylcyclohexylamine, N-methylvinylamine, and N-methylallylamine; aliphatic diamines and triamines, such as N-methylethylenediamine, N-ethylethylenediamine, N,N'-dimethylethylenediamine, N,N'-diethylethylenediamine, N-methyltrimethylenediamine, N-ethyltrimethylenediamine, N,N'-dimethyltrimethylenediamine, N,N'-diethyltrimethylenediamine, diethylenetriamine, and dipropylenetriamine; aromatic amines such as N-methylbenzylamine, N-ethylbenzylamine, N-methylphenytylamine, and N-ethylphenethylamine; monoalkanolamines such as N-methylethanolamine, N-ethylethanolamine, N-propylethanolamine, N-isopropylethanolamine, N-butylethanolamine, and N-isobutylethanolamine; dialkanolamines such as diethanolamine, dipropanolamine, diisopropanolamine, and dibutanolamine; cyclic amines such as pyrolidine, piperidine, piperadine, N-methylpiperadine, N-ethylpiperadine, morpholine, and thiomorpholine, and the like. These secondary amines may be used alone, or two or more of these secondary amines may also be used in combination. In these secondary amines, dialkanolamines and dialkylamines may be preferred, dialkanolamines may be more preferred, and diethanolamine may particularly be preferred.

The amount of secondary amine to be used may appropriately be adjusted according to the amount of monomer to be used, and thus, it is not particularly limited. For example, the amount of secondary amine to be used may be set in such a manner that the pH of an aqueous monomer solution can preferably be not lower than 7 and not higher than 10, and more preferably not lower than 7 and not higher than 9. Specifically, the amount of secondary amine to be used may preferably be not smaller than 10 ppm and not greater than 10,000 ppm, more preferably not smaller than 50 ppm and not greater than 5,000 ppm, relative to the amount of monomer to be used.

Then, polymerization is carried out with an azo compound and/or an organic peroxide added to the aqueous monomer solution as the polymerization initiator. In this case, if hydrogen peroxide is used as the polymerization initiator, due to the strong ability of dehydrogenation, the graft reaction can easily be promoted so that a remarkable increase in the molecular weight may be observed, and thus an azo compound and/or an organic peroxide is used as the polymerization initiator.

In the case of adjusting the pH of the polymerization solution using a secondary amine during the polymerization, the pH is adjusted to a prescribed value by adding the secondary amine or an aqueous solution thereof to the reaction solution at an appropriate stage from the start of the polymerization reaction to the completion thereof. As the secondary amine to be used for adjusting the pH of the reaction solution during the polymerization, there can be mentioned the above-described secondary amines recited as the secondary amine usable for adjusting the pH of the aqueous monomer solution. These secondary amines may be used alone, or two or more of these secondary amines may also be used in combination. Moreover, the secondary amine to be added for adjusting the pH of the reaction solution during the polymerization may either be same as or different from the secondary amine to be added for adjusting the pH of the aqueous monomer solution.

The amount of secondary amine to be used may appropriately be adjusted according to the amount of monomer to be used, and thus, it is not particularly limited. For example, the amount of secondary amine to be used may be set in such a manner that the pH of an aqueous monomer solution may preferably be not lower than 7 and not higher than 10, more preferably not lower than 7 and not higher than 9. Specifically, the amount of secondary amine to be used may preferably be not smaller than 10 ppm and not greater than 10,000 ppm, more preferably not smaller than 50 ppm and not greater than 5,000 ppm, relative to the amount of monomer to be used.

As the azo compound to be used as the polymerization initiator, there can be mentioned, for example, 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), 2,2'-azobis(isobutyric acid) dimethyl ester, 4,4'-azobis(4-cyanovaleric acid), 2,2'-azobis(2-methylpropionamidine)dihydrochloride, 2,2'-azobis[N-(2-carboxyethyl)-2-methylpropionamidine]n hydrate, 2,2'-azobis[2-(2-imidazolyn-2-yl)propane]dihydrochloride, 2,2'-azobis[2-(2-imidazolyn-2-yl)propane]disulfate dihydrate, 1,1'-azobis(cyclohexane-1-carbonitrile), and the like. These azo compounds may be used alone, or two or more of these azo compounds may also be used in combination. In these azo compounds, 2,2'-azobis(2-methylbutyronitrile) and 2,2'-azobis(isobutyric acid) dimethyl ester may particularly be preferred.

As the organic peroxide to be used as the polymerization initiator, there can be mentioned, for example, benzoyl peroxide, dicumyl peroxide, 2,5-dimethyl-2,5-di(t-butylperoxy)hexane, 1,1'-di-t-butylperoxy-3,3,5-trimethylenecyclohexane, 1,3-di-(t-butylperoxy)-diisopropylbenzene, di-t-butylperoxide, t-butylhydroperoxide, t-butylperoxy-2-ethylhexanoate, t-butylperoxypivalate, t-amylperoxy-2-ethylhexanoate, t-amylhydroperoxide, and the like. These organic peroxides may be used alone, or two or more of these organic peroxides may also be used in combination. In these organic peroxides, t-butylhydroperoxide and t-amylperoxy-2-ethyl hexanoate may be preferred, and t-amylperoxy-2-ethylhexanoate may particularly be preferred.

The concentration of polymerization initiator in the polymerization reaction may appropriately be adjusted according to the amount of monomer component to be used, and thus, it is not particularly limited. For example, it may preferably be not lower than 0.001 parts by mass and not higher than 3 parts by mass, more preferably not lower than 0.005 parts by mass and not higher than 2 parts by mass, and still more preferably not lower than 0.01 parts by mass and not higher than 1 part by mass, relative to 100 parts by mass of the monomer. At the time of carrying out the polymerization reaction, there can be used, if necessary, optional chain transfer agents, pH adjusting agents, buffers, and the like, in addition to the polymerization initiator.

The polymerization reaction is usually carried out in an aqueous medium. The "aqueous medium" as used herein means water, or a mixed solvent of water and a lower alcohol. As the lower alcohol, there can be mentioned, for example, methyl alcohol, ethyl alcohol, isopropyl alcohol, diethylene glycol, and the like.

The reaction temperature in the polymerization reaction may appropriately be set according to the conditions such as reaction raw materials, and it may preferably be not lower than 40° C. and not higher than 100° C., more preferably not lower than 50° C. and not higher than 95° C., and still more preferably not lower than 60° C. and not higher than 90° C.

After the polymerization reaction, the amount of residual monomer (i.e., the amount of monomer remaining in the reaction solution) is reduced by adding an organic acid or an aqueous solution thereof to the reaction solution. With this operation, the amount of residual monomer may preferably be reduced to 10 ppm or smaller, more preferably to 8 ppm or smaller.

The organic acid to be used for reducing the amount of residual monomer may preferably be polyvalent carboxylic acid. Specifically, there can be mentioned, for example, oxalic acid, malonic acid, succinic acid, aspartic acid, citric acid, glutamic acid, fumaric acid, malic acid, maleic acid, phthalic acid, trimellitic acid, pyromellitic acid, and the like.

More preferably, it may be an organic acid, which is a polyvalent carboxylic acid and which has a first dissociation constant of its carboxyl group of 3.0 or lower and a solubility of its calcium salt in water at 20° C. of 0.1% by mass or higher. Specifically, there can be mentioned, for example, malonic acid, ethylmalonic acid, ethylmethylmalonic acid, ethylpropylmalonic acid, and the like. These organic acids may be used alone, or two or more of these organic acids may also be used in combination. In these organic acids, malonic acid may particularly be preferred.

The use of an organic acid meeting the above-described conditions may be preferred because not only a transparent and clear aqueous solution can be obtained, but also the molecular weight lowering at the time of storage can be suppressed to thereby stabilize the quality, even in the case of dissolving the obtained polyvinylpyrrolidone powder composition in hard water containing calcium ions or magnesium ions in a great amount.

The amount of organic acid to be used may appropriately be adjusted according to the amount of monomer to be used, and thus, it is not particularly limited. For example, the amount of organic acid to be used may be set in such a manner that the pH of the reaction solution may preferably be not higher than 5, more preferably not lower than 3 and not higher than 4. Specifically, the amount of organic acid to be used may preferably be not smaller than 100 ppm and not greater than 10,000 ppm, more preferably not smaller than 500 ppm and not greater than 5,000 ppm, relative to the amount of monomer to be used.

Since an organic acid is added to a reaction solution after the polymerization reaction, the polyvinylpyrrolidone powder composition of the present invention contains the organic acid at a content based on the above-described amount of organic acid to be used. However, in the case where a secondary amine or an aqueous solution thereof is added for adjusting the pH of an aqueous monomer solution and/or for adjusting the pH of a reaction solution during the polymerization, the organic acid may form a salt with the secondary amine. In this case, the polyvinylpyrrolidone powder composition of the present invention contains a salt of the secondary amine and the organic acid.

If the amount of residual monomer is reduced using an organic acid, the amount of monomer remaining in the aqueous polyvinylpyrrolidone solution to be finally obtained may preferably be not greater than 10 ppm, more preferably nor greater than 8 ppm, and still more preferably not greater than 6 ppm, relative to the content of polyvinylpyrrolidone. The amount of remaining monomer can be determined by measuring the amount of N-vinyl-2-pyrrolidone remaining in the aqueous polyvinylpyrrolidone solution using liquid chromatography at the absorption wavelength of 235 nm, and calculating the relative amount of remaining N-vinyl-2-pyrrolidone, relative to the content of polyvinylpyrrolidone.

In the case of adjusting the pH of a polymerization solution using a secondary amine after the polymerization, the amount of residual monomer is reduced, and then, the pH is adjusted to a prescribed value by adding a secondary amine or an aqueous solution thereof to the reaction solution. As the secondary amine usable for adjusting the pH of a reaction solution after the polymerization, there can be mentioned the above-described secondary amines recited as the secondary amines usable for adjusting the pH of an aqueous monomer solution before the polymerization. These secondary amines may be used alone, or two or more of these secondary amines may also be used in combination. Moreover, the secondary amine to be added for adjusting the pH of a reaction solution after the polymerization may be same or different from the secondary amine to be added for adjusting the pH of an aqueous monomer solution, and/or the secondary amine to be added for adjusting the pH of a reaction solution during the polymerization.

The amount of secondary amine to be used may appropriately be adjusted according to the amount of organic acid to be used, and thus, it is not particularly limited. For example, the amount of secondary amine to be used may be set in such a manner that the pH of a reaction solution may preferably be not lower than 4 and not higher than 7, more preferably not lower than 5 and not higher than 7. Specifically, the amount of secondary amine to be used may preferably be not smaller than 100 ppm and not greater than 10,000 ppm, more preferably not smaller than 120 ppm and not greater than 5,000 ppm, relative to the amount of monomer to be used.

In the case of adding a secondary amine or an aqueous solution thereof for adjusting the pH of a reaction solution after the amount of residual monomer is reduced, an organic acid in the reaction solution may form a salt with the secondary amine. In this case, the polyvinylpyrrolidone powder composition of the present invention contains a salt of the secondary amine and the organic acid.

The polymerization of N-vinyl-2-pyrrolidone by the above-described method provides polyvinylpyrrolidone in the form of an aqueous solution. This aqueous polyvinylpyrrolidone solution may be dried and then pulverized to thereby obtain a polyvinylpyrrolidone powder composition.

As the method of drying an aqueous polyvinylpyrrolidone solution, any of the conventional methods can be employed, and thus, it is not particularly limited. For example, there can be mentioned a spray dryer drying method, a drum rotary dryer drying method, or the like. The drying conditions such as temperature and time may appropriately be adjusted according to the amount of aqueous polyvinylpyrrolidone solution to be dried, and they are not particularly limited. For example, the drying operation may preferably be carried out at not lower than 100° C. and not higher than 160° C., more preferably at not lower than 100° C. and not higher than 150° C., preferably for not longer than 1 hour, more preferably for not longer than 30 minutes, and still more preferably for not longer than 10 minutes.

As the method of pulverizing polyvinylpyrrolidone thus dried, any of the conventional methods can be employed, and thus, it is not particularly limited. For example, there can be mentioned a method of coarsely dry pulverizing with a pin mill, a hammer mill, or the like; and a method of finely dry pulverizing with a jet mill, a roller mill, a ball mill, a micron mill, or the like. The pulverizing conditions are not particularly limited, but they may appropriately be set to obtain the desired granularity according to the application of the composition, or the like.

The content of secondary amine or salt thereof in the polyvinylpyrrolidone powder composition of the present invention to be finally obtained may preferably be not lower than 500 ppm and not higher than 10,000 ppm, more preferably not lower than 800 ppm and not higher than 6,000 ppm, and still more preferably not lower than 1,000 ppm and not higher than 4,000 ppm. The content of secondary amine or salt thereof can be determined by preparing an aqueous solution of the polyvinylpyrrolidone powder composition, measuring the content of secondary amine or salt thereof in the aqueous solution using an ion chromatography apparatus (e.g., ICS-2000, available from Nippon Dionex K. K.; using Ion Pac AS-15 as a column), and calculating the relative content of secondary amine or salt thereof, relative to the content of polyvinylpyrrolidone.

As described above, the use of method (1) can provide any of the polyvinylpyrrolidone powder compositions in the first, second, and third aspects, in the polyvinylpyrrolidone powder compositions of the present invention. The method (1) may be combined with method (2), method (3) and/or method (4).

<Method (2)>

According to this method, after completion of the polymerization, a filtration operation is carried out, and then, a drying operation is carried out by means of a heating surface adhesion-type drying method, a freeze drying method, or a vacuum drying method.

First, until the polymerization is carried out with an azo compound and/or an organic peroxide added to an aqueous monomer solution as the polymerization initiator and the amount of residual monomer (i.e., the amount of monomer remaining in the reaction solution) is reduced by adding an organic acid or an aqueous solution thereof to the reaction solution after the polymerization reaction, the same operations as described in the case of method (1) are carried out, except that the pH of a polymerization solution is not adjusted using a secondary amine before, during, and/or after the polymerization.

Then, as described in the case of method (1), after the amount of residual monomer is reduced by adding an organic acid or an aqueous solution thereof to the reaction solution, the pH is adjusted to a prescribed value by adding a base, other than the secondary amine, or an aqueous solution thereof to the reaction solution. As the base usable for adjusting the pH of the reaction solution after the polymerization, there can be mentioned, for example, guanidine carbonate, urea, carbonates and hydroxides of alkali metals, such as sodium carbonate and potassium hydroxide, carbonates and hydroxides of alkali earth metals, such as calcium carbonate and magnesium hydroxide. These bases may be used alone, or two or more of these bases may also be used in combination. In these bases, guanidine carbonate may be preferred.

The amount of base to be used may appropriately be adjusted according to the amount of organic acid to be used, and thus, it is not particularly limited. The amount of base to be used may be set in such a manner that the pH of the reaction solution may preferably be not lower than 4 and not higher than 7, more preferably not lower than 5 and not higher than 7. Specifically, the amount of base to be used may preferably be not smaller than 100 ppm and not greater than 10,000 ppm, more preferably not smaller than 120 ppm and not greater than 5,000 ppm, relative to the amount of monomer to be used.

In the case a base or an aqueous solution thereof is added for adjusting the pH of the reaction solution after the amount of residual monomer is reduced, the organic acid in the reaction solution may form a salt with the base. In this case, the polyvinylpyrrolidone powder composition of the present invention contains a salt of the base and the organic acid.

Then, the reaction solution is filtered as it is or after being diluted to an appropriate concentration. The pore size of a filter to be used for the filtration may preferably be not smaller than 2 μm and not greater than 10 μm, more preferably not smaller than 4 μm and not greater than 8 μm. At the time of filtration, it is preferred that a filter is set in a filtration apparatus and first, for example, a hydrophilic solvent such as isopropanol is allowed to pass though the filter and then the filter is made hydrophilic by allowing refined water such as ion exchanged water to pass through the filter. The filtration operation may be carried out, if necessary, under a reduced pressure.

The aqueous polyvinylpyrrolidone solution thus obtained is dried by means of a heating surface adhesion-type drying method, a freeze drying method, or a vacuum drying method. The drying conditions such as temperature and time may appropriately be adjusted according to the amount of aqueous polyvinylpyrrolidone solution to be dried and the drying method, and they are not particularly limited. For example, in the case of a heating surface adhesion-type drying method, the drying operation may preferably be carried out at not lower than 100° C. and not higher than 160° C., more preferably at not lower than 100° C. and not higher than 150° C., preferably for not longer than 1 hour, more preferably for not longer than 30 minutes, and still more preferably for not longer than 10 minutes. Moreover, in the case of a freeze drying method, the drying operation may preferably be carried out at not lower than −50° C. and not higher than −5° C. or lower, more preferably at not lower than −40° C. and not higher than −10° C., preferably for not longer than 20 hours, more preferably for not longer than 15 hours, and still more preferably for not longer than 10 hours. Furthermore, in the case of a vacuum drying method, the drying operation may preferably be carried out at a degree of reduced pressure of not lower than 10 N/m$^2$ and not higher than 40,000 N/m$^2$, more preferably not lower than 100 N/m$^2$ and not higher than 30,000 N/m$^2$, preferably at not lower than 10° C. and not higher than 50° C., more preferably at not lower than 20° C. and not higher than 45° C., preferably for not longer than 20 hours, more preferably for not longer than 15 hours, and still more preferably for not longer than 10 hours.

The polyvinylpyrrolidone thus dried is pulverized in the same manner as described in the case of method (1) to thereby finally obtain the polyvinylpyrrolidone powder composition of the present invention.

The content of base or salt thereof in the polyvinylpyrrolidone powder composition of the present invention to be obtained finally may preferably be not lower than 500 ppm and not higher than 10,000 ppm, more preferably not lower than 800 ppm and not higher than 6,000 ppm, and still more preferably not lower than 1,000 ppm and not higher than 4,000 ppm. The content of base or salt thereof can be determined by preparing an aqueous solution of the polyvinylpyrrolidone powder composition, measuring the content of base or salt thereof contained in the aqueous solution using an ion chromatography apparatus (e.g., ICS-2000, available from Nippon Dionex K. K.; using Ion Pac AS-15 as a column), and calculating the relative content of base or salt thereof, relative to the content of polyvinylpyrrolidone.

As described above, the use of method (2) can provide the polyvinylpyrrolidone powder composition in the first aspect, in the polyvinylpyrrolidone powder compositions of the present invention. The method (2) may be combined with method (1), method (3) and/or method (4). In particular, the combined use of method (2) with method (1) and/or method (4) can provide the polyvinylpyrrolidone powder composition in the third aspect.

<Method (3)>

According to this method, after completion of the polymerization by dropping polymerization using a polymerization initiator usable at low temperatures with the internal temperature maintained at 50° C. or lower, a drying operation is carried out by means of a freeze drying method or a vacuum drying method.

First, the same operation as described in the case of method (1) is carried out for the polymerization reaction, except that a polymerization initiator usable at low temperatures is used, an aqueous solution of the polymerization initiator usable at low temperatures is added dropwise to an aqueous monomer solution or an aqueous monomer solution is added dropwise to an aqueous solution of the polymerization initiator usable at low temperatures, the internal temperature is maintained at 50° C. or lower, and the pH of a polymerization solution is not adjusted using a secondary amine before, during, and/or after the polymerization.

The polymerization initiator usable at low temperatures is not particularly limited, so long as it has a polymerization activity at 50° C. or lower. There can be mentioned, for example, azo compounds such as dimethyl 2,2'-azobis(2-methylpropionate), 2,2'-azobis(2,4-dimethylvaleronitrile), 2,2'-azobis(4-methoxy-2,4'-dimethylvaleronitrile), 2,2'-azobis(2-methylpropionitrile), and 2,2'-azobis(2-cyclopropylpropionitrile); organic peroxides such as isobutylperoxide, di-2-propenyl peroxydicarbonate, t-butyl peroxyneodecanoate, and t-hexyl peroxypivalate; and the like. These polymerization initiators may be used alone, or two or more of these polymerization initiators may also be used in combination. In these polymerization initiators, dimethyl 2,2'-azobis (2-methylpropionate), 2,2'-azobis-(4-methoxy-2,4-dimethylvaleronitrile), 2,2'-azobis-(2-methylpropionitrile), and 2,2'-azobis(2-cyclopropylpropionitrile) may be preferred, and dimethyl 2,2'-azobis(2-methylpropionate) and 2,2'-azobis(2-cyclopropylpropionitrile) may particularly be preferred.

The concentration of polymerization initiator usable at low temperatures in the polymerization reaction may appropriately be adjusted according to the amount of monomer component to be used, and thus, it is not particularly limited. For example, it may preferably be not lower than 0.001 parts by mass and not higher than 3 parts by mass, more preferably not lower than 0.005 parts by mass and not higher than 2 parts by mass, and still more preferably not lower than 0.01 parts by mass and not higher than 1 part by mass, relative to 100 parts by mass of the monomer. At the time of carrying out the polymerization reaction, there can be used, if necessary, optional chain transfer agents, pH adjusting agents, buffers, and the like, in addition to the polymerization initiator usable at low temperatures.

Then, after the amount of residual monomer is reduced by adding an organic acid or an aqueous solution thereof to a reaction solution in the same manner as described in the case of method (1), the pH is adjusted to a prescribed value by adding a base, other than the secondary amine, or an aqueous solution thereof to the reaction solution in the same manner as described in the case of method (2).

In the case where a base or an aqueous solution thereof is added for adjusting the pH of a reaction solution after the amount of residual monomer is reduced, the organic acid in the reaction solution may form a salt with the base. In this case, the polyvinylpyrrolidone powder composition of the present invention contains a salt of the base and the organic acid.

The aqueous polyvinylpyrrolidone solution thus obtained is dried by means of a freeze drying method or a vacuum drying method in the same manner as described in the case of method (2). The drying conditions such as temperature and time may appropriately be adjusted according to the amount of aqueous polyvinylpyrrolidone solution to be dried and the drying method, and they are not particularly limited. As the preferred drying conditions such as temperature and time, there can be mentioned the above-described conditions recited in the explanation of method (2).

The polyvinylpyrrolidone thus dried is pulverized in the same manner as described in the case of method (1) to thereby finally obtain the polyvinylpyrrolidone powder composition of the present invention.

The content of base or salt thereof in the polyvinylpyrrolidone powder composition of the present invention to be obtained finally may preferably be not lower than 500 ppm and not higher than 10,000 ppm, more preferably not lower than 800 ppm and not higher than 6,000 ppm, and still more preferably not lower than 1,000 ppm and not higher than 4,000 ppm. The content of base or salt thereof can be determined by preparing an aqueous solution of the polyvinylpyrrolidone powder composition, measuring the content of base or salt thereof contained in the aqueous solution using an ion chromatography apparatus (e.g., ICS-2000, available from Nippon Dionex K. K.; using Ion Pac AS-15 as a column), and calculating the relative content of base or salt thereof, relative to the content of polyvinylpyrrolidone.

As described above, the use of method (3) can provide the polyvinylpyrrolidone powder composition in the first aspect, in the polyvinylpyrrolidone powder compositions of the present invention. The method (3) may be combined with method (1), method (2) and/or method (4). In particular, the combined use of method (3) with the method (1) and/or method (4) can provide the polyvinylpyrrolidone powder composition in the third aspect.

<Method (4)>

According to this method, an antioxidant is added to a polymerization solution before, during, and/or after the polymerization.

First, until the polymerization is carried out with an azo compound and/or an organic peroxide added to an aqueous monomer solution as the polymerization initiator and the amount of residual monomer (i.e., the amount of monomer remaining in the reaction solution) is reduced by adding an organic acid or an aqueous solution thereof to the reaction solution after the polymerization reaction, the same operations as described in the case of method (1) are carried out, except that the pH of a polymerization solution is not adjusted using a secondary amine before, during, and/or after the polymerization.

Then, as described in the case of method (1), after the amount of residual monomer is reduced by adding an organic acid or an aqueous solution thereof to the reaction solution, the pH is adjusted to a prescribed value by adding a base, other than the secondary amine, or an aqueous solution thereof to the reaction solution in the same manner as described in the case of method (2).

At any stage to this step, an antioxidant is added to the polymerization solution. As the usable antioxidants, there can be mentioned, for example, phenol type antioxidants such as sodium salicylate, methylbenzotriazol potassium salt, 2-mercaptobenzimidazol, 2,4-dihydroxybenzophenone, 2,6-di-t-butyl-p-cresol, butylated hydroxyanisol, 2,6-di-t-butyl-4-methylphenol, 2,6-di-t-butyl-4-ethylphenol, stearyl-β-(3,5-di-t-butyl-4-hydroxyphenyl)propionate, 3,4,5-trihydroxybenzoic acid propyl ester, hydroquinone, and catechol; bisphenol type antioxidants such as 2,2'-methylenebis(4-methyl-6-t-butylphenol), 2,2'-methylenebis(4-ethyl-6-t-butylphenol), 4,4'-thiobis(3-methyl-6-t-butylphenol), 4,4'-butylidene-bis(3-methyl-6-t-butylphenol), 3,9-bis [1,1-dimethyl-2-[β-(3-t-butyl-4-hydroxy-5-methylphenyl) propionyloxy]ethyl]-2,4,8,10-tetraoxaspiro[5,5]undecane, and 4,4'-(2,3-dimethyltetramethylene)dipirocatechol; high-molecular phenol type antioxidants such as 1,1,3-tris(2-methyl-4-hydroxy-5-t-butylphenyl)butane, 1,3,5-trimethyl-2,4, 6-tris(3,5-di-t-butyl-4-hydroxybenzyl)benzene, tetrakis [methylene-3-(3',5'-di-t-butyl-4'-hydroxy-phenyl) propionate]methane, bis[3,3'-bis(4'-hydroxy-3'-t-butylphenyl)butyric acid]glycol ester, 1,3,5-tris(3',5'-di-t-butyl-4'-hydroxybenzyl)-s-triadine-2,4,6-(1H,3H,5H)trion, and tocopherols; sulfur type antioxidants such as dilauryl-3, 3'-thiodipropionate, dimyristyl-3,3'-thiodipropionate, distearyl-3,3'-thiodipropionate, 2-mercaptobenzimidazol, tetrakismethylene-3-(laurylthio)propionatemethane, and stearylthiopropylamide; phosphorus type antioxidants such as triphenyl phosphite, diphenyl isodecyl phosphite, phenyl diisodecyl phosphite, 4,4'-butylidene-bis(3-methyl-6-t-butylphenyl-ditridecyl) phosphite, cyclic neopentanetetrayl-bis(octadecyl) phosphite, tris(nonylphenyl) phosphite, tris(mono and/or dinonylphenyl) phosphite, diisodecyl pentaerythritol diphosphite, 9,10-dihydro-9-oxa-10-phosphaphenanethrene-10-oxide, 10-(3,5-di-5-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl)phosphite, cyclic neopentanetetraylbis(2,6-di-t-butyl-4-methylphenyl)-phosphite, 2,2-methylenebis(4,6-di-t-butylphenyl)octyl phosphite, distearyl pentaerythritol diphosphite, di(2,4-di-t-butylphenyl) phosphite, and tetrakis-(2,4-di-t-butylphenyl)-4,4-biphenylene phosphite; alcohol type antioxidants such as erythorbic acid, sodium erythorbate, and isopropyl citrate; amine type antioxidants such as methylated diphenylamine, ethylated diphenylamine, butylated diphenylamine, octylated diphenylamine, laurylated diphenylamine, N,N'-di-secbutyl-p-phenylenediamine, and N,N'-diphenyl-p-phenylenediamine; hindered amine type antioxidants such as 4-benzoyloxy-2,2,6,6-tetramethyl piperidine, bis-(2,2,6,6-tetramethyl-4-piperidinyl)sebacate, bis(1-octyloxy-2,2,6,6-tetramethyl-4-piperidinyl)sebacate, bis(1,2,2,6,6-pentamethyl-4-piperidinyl)sebacate, dimethyl succinate-1-(2-hydroxyethyl)-4-hydroxy-2,2,6,6-tetramethylpiperidine and condensates thereof, and 8-acetyl-3-dodecyl-7,7,9,9-tetramethyl-1,3,8-triazaspiro[4,5]decane-2,4-dion; and the like. These antioxidants may be used alone, or two or more of these antioxidants may also be used in combination. In these antioxidants, the phenol type antioxidants may be preferred, and sodium salicylate may particularly be preferred.

The amount of antioxidant to be used may preferably be not smaller than 0.0001% by mass and not greater than 10% by mass, more preferably not smaller than 0.001% by mass and not greater than 5% by mass, relative to the amount of polyvinylpyrrolidone to be finally obtained. If the amount of antioxidant to be used is smaller than 0.0001% by mass, it may be difficult to stabilize the K value of polyvinylpyrrolidone. To the contrary, if the amount of antioxidant to be used is greater than 10% by mass, characteristics such as properties and appearance, inherent to polyvinylpyrrolidone, may be deteriorated.

The aqueous polyvinylpyrrolidone solution thus obtained is dried by any of the conventional methods, such as a spray dryer drying method or a drum rotary dryer drying method, in the same manner as described in the case of method (1).

The polyvinylpyrrolidone thus dried is pulverized in the same manner as described in the case of method (1) to thereby finally obtain the polyvinylpyrrolidone powder composition of the present invention.

The content of antioxidant in the polyvinylpyrrolidone powder composition of the present invention to be obtained finally may preferably be not lower than 0.001% by mass and not higher than 10% by mass, more preferably not lower than 0.001% by mass and not higher than 5% by mass. The content of antioxidant can be determined by preparing an aqueous solution of the polyvinylpyrrolidone powder composition, measuring the content of antioxidant contained in the aqueous solution using liquid chromatography, and calculating the relative content of antioxidant, relative to the content of polyvinylpyrrolidone.

As described above, the use of method (4) can provide the polyvinylpyrrolidone powder composition in the second aspect, in the polyvinylpyrrolidone powder compositions of the present invention. The method (4) may be combined with method (1), method (2) and/or method (3). In this case, the polyvinylpyrrolidone powder composition in the third aspect can be obtained.

EXAMPLES

The present invention will be explained below in detail by reference to Examples, but the present invention is not limited to these Examples. The present invention can be put into practice after appropriate modifications or variations within a range meeting the gists described above and later, all of which are included in the technical scope of the present invention. In the following description, "wt %" means "% by mass" and "part(s)" means "part(s) by mass".

First, the method of measuring the content of insoluble substances and the method of measuring the K value lowering ratio will be explained.

<<Content of Insoluble Substances>>

First, 5,000 g of ion exchanged water from which insoluble substances were removed is collected by allowing ion exchanged water to pass through a filter having a pore size of 0.45 μm (available from ADVANTEC, mixed cellulose ester type, 90 mm in diameter).

Then, 4,900 g of the ion exchanged water from which insoluble substances were removed is placed in a 5-L beaker, to which 100 g of a polyvinylpyrrolidone sample is added under stirring with stirring blades so as to be dissolved over 60 minutes. With this operation, 5,000 g of a 2 wt % aqueous polyvinylpyrrolidone solution can be obtained.

The mass ($W_1$ g) of a polytetrafluoroethylene filter having a pore size of 1.2 μm (available from Sartorius, 50 mm in diameter) is accurately measured to 0.0001 g, and the filter is set on a suction filtering apparatus. Then, 50 g of isopropanol is allowed to pass through the filter, and 50 g of the ion exchanged water from which insoluble substances were removed is allowed to pass though the filter, so that the filter is made hydrophilic. Then, 5,000 g of the 2 wt % aqueous polyvinylpyrrolidone solution obtained above is suction-filtered.

The filtration operation is finished after 4 hours from the start of the suction filtration, and the amount of remaining solution is measured to determine the amount ($W_3$ g) of filtered solution.

Then, 50 g of the ion exchanged water from which insoluble substances were removed is allowed to pass through the filter three times for washing the filter. The filter is taken out form the suction filtering apparatus and dried using a vacuum oven at a degree of reduced pressure of –0.09 MPa at 70° C. for 90 minutes. After the drying operation, and the filter is placed in a desiccator and cooled for 10 minutes, after which the mass ($W_2$ g) of the filter is measured. The content of insoluble substances is calculated according to the following formula:

Content of insoluble substances (ppm/relative to polyvinylpyrrolidone sample)=[($W_2$ g–$W_1$ g)/($W_3$ g×0.02)]×1,000,000

<<K Value Lowering Ratio>>

First, the K value ($K_1$) of a polyvinylpyrrolidone sample is measured. Then, 5 g of the polyvinylpyrrolidone sample is placed in a 20-mL screw tube, which is tightly closed and placed in a constant-temperature oven adjusted to 80° C. After two weeks, the screw tube is taken out from the constant-temperature oven and the K value ($K_2$) of the polyvinylpyrrolidone sample is measured in the same manner. The K value lowering ratio is calculated according to the following formula:

$$K \text{ value lowering ratio } (\%) = [(K_1 - K_2)/K_1] \times 100$$

<<Average Particle Diameter>>

First, a polyvinylpyrrolidone sample is dispersed in ethyl acetate. Then, the dispersion thus obtained is measured for particle size distribution using the Laser Diffraction Particle Size Analyzer SALD-3000 available from Shimadzu Corporation. The median size in the resultant particle size distribution data is regarded as the average particle diameter.

Then, in the following Example 1 and Comparative Example 1, polyvinylpyrrolidone powder compositions were actually prepared and measured for the content of insoluble substances and the K value lowering ratio.

Example 1

<Polymerization Step>

A reactor vessel equipped with a stirrer, a thermometer, and a reflux condenser was charged with 640 parts of ion exchanged water and 160 parts of N-vinylpyrrolidone, to which 0.02 parts of diethanolamine was added to adjust the aqueous monomer solution to pH 8.3. While stirring the aqueous monomer solution, nitrogen gas was introduced into the rector vessel to remove the dissolved oxygen, and the reactor vessel was heated under stirring so that the internal temperature of the reactor vessel became to 75° C. To this reactor vessel was added a polymerization initiator solution containing 0.44 parts of 2,2'-azobis(2-methylbutyronitrile) dissolved in 4.5 parts of isopropanol to start the polymerization. After the addition of polymerization initiator solution, the temperature of water bath was raised according to the internal temperature from the point of time when there was observed a rise in the internal temperature by the polymerization reaction, thereby carrying out the reaction.

<Acid Treatment Step>

The reaction was continued for about 3 hours from the addition of the polymerization initiator solution, to which an aqueous acid solution containing 0.14 parts of malonic acid dissolved in 1.8 parts of ion exchanged water was added to adjust the reaction solution to pH 3.7, and the internal temperature was maintained at 90° C. for 90 minutes.

<Alkali Treatment Step>

Then, an aqueous alkali solution containing 0.24 parts of diethanolamine dissolved in 2.7 parts of ion exchanged water was added to adjust the reaction solution to pH 6.6, and the internal temperature was maintained at 90° C. for 30 minutes, thereby obtaining an aqueous polymer solution containing 20 wt % of polyvinylpyrrolidone.

<Drying and Pulverization Step>

The aqueous polymer solution thus obtained was placed in a drum rotary dryer and dried at a drum surface temperature of 140° C. for 20 seconds (drum revolutions, 1.5 rpm). The aqueous polymer solution thus dried was pulverized using Victory Mill VP-1 (available from Hosokawa Micron Corp.), thereby obtaining a polyvinylpyrrolidone powder composition having a solid content of 97.0 wt %, an average particle diameter of 205 µm, and a content of diethanolamine or a salt thereof of 1.650 ppm.

<Evaluation>

The polyvinylpyrrolidone powder composition thus obtained was used as a sample. The content of insoluble substances and the K value lowering ratio were measured and found to be 33 ppm and 4.5%, respectively. The results are shown in Table 1.

Example 2

<Polymerization Step>

A reactor vessel equipped with a stirrer, a thermometer, and a reflux condenser was charged with 640 parts of ion exchanged water and 160 parts of N-vinylpyrrolidone. While stirring the aqueous monomer solution, nitrogen gas was introduced into the rector vessel to remove the dissolved oxygen, and the reactor vessel was heated under stirring so that the internal temperature of the reactor vessel became to 75° C. To this reactor vessel was added a polymerization initiator solution containing 0.44 parts of 2,2'-azobis(2-methylbutyronitrile) dissolved in 4.5 parts of isopropanol to start the polymerization. After the addition of polymerization initiator solution, the temperature of water bath was raised according to the internal temperature from the point of time when there was observed a rise in the internal temperature by the polymerization reaction, thereby carrying out the reaction.

<Acid Treatment Step>

The reaction was continued for about 3 hours from the addition of the polymerization initiator solution, to which an aqueous acid solution containing 0.14 parts of malonic acid dissolved in 1.8 parts of ion exchanged water was added to adjust the reaction solution to pH 3.5, and the internal temperature was maintained at 90° C. for 90 minutes.

<Alkali Treatment Step>

Then, an aqueous alkali solution containing 0.4 parts of guanidine carbonate dissolved in 4.2 parts of ion exchanged water was added to adjust the reaction solution to pH 6.7, and the internal temperature was maintained at 90° C. for 30 minutes, thereby obtaining an aqueous polymer solution containing 20 wt % of polyvinylpyrrolidone.

<Antioxidant Addition Step>

To the aqueous polymer solution thus obtained was added 0.8 parts of sodium salicylate as an antioxidant, followed by dissolution under stirring.

<Filtration Step>

The aqueous polymer solution (containing sodium salicylate) thus obtained was diluted with ion exchanged water to a concentration of 5 wt %. A polycarbonate filter having a pore size of 8 µm (available from Advantec Toyo Kaisha, Ltd., 47 mm in diameter) was set on a filtering apparatus, and 50 g of isopropanol was allowed to pass though the filter and then the filter was made hydrophilic by allowing 50 g of ion exchanged water to pass though the filter. Then, using this filtering apparatus, the aqueous polymer solution diluted to a concentration of 5 wt % was suction-filtered.

<Drying and Pulverization Step>

The aqueous polymer solution thus obtained was placed in a drum rotary dryer and dried at a drum surface temperature of 140° C. for 20 seconds (drum revolutions, 1.5 rpm). The aqueous polymer solution thus dried was pulverized using Victory Mill VP-1 (available from Hosokawa Micron Corp.), thereby obtaining a polyvinylpyrrolidone powder composition having a solid content of 97.2 wt % and an average particle diameter of 260 µm.

<Evaluation>

The polyvinylpyrrolidone powder composition thus obtained was used as a sample. The content of insoluble substances and the K value lowering ratio were measured and found to be 40 ppm and 5.0%, respectively. The results are shown in Table 1.

Example 3

<Polymerization Step>

The polymerization reaction was carried out in the same manner as described in Example 2.

<Acid Treatment Step>

The acid treatment was carried out in the same manner as described in Example 2.

<Alkali Treatment Step>

The alkali treatment was carried out in the same manner as described in Example 2.

<Antioxidant Addition Step>

The antioxidant was added in the same manner as described in Example 2.

<Filtration Step>

The filtration was carried out in the same manner as described in Example 2.

<Drying and Pulverization Step>

The aqueous polymer solution thus filtered was placed in a vacuum oven and dried at a degree of reduced pressure of about 665 N/m² (about 5 mmHg) at an oven temperature of 50° C. for a drying time of 5 hours. The aqueous polymer solution thus dried was pulverized using Victory Mill VP-1 (available from Hosokawa Micron Corp.), thereby obtaining a polyvinylpyrrolidone powder composition having a solid content of 97.2 wt % and an average particle diameter of 212 μm.

<Evaluation>

The polyvinylpyrrolidone powder composition thus obtained was used as a sample. The content of insoluble substances and the K value lowering ratio were measured and found to be 35 ppm and 5.5%, respectively. The results are shown in Table 1.

Example 4

<Polymerization Step>

The polymerization reaction was carried out in the same manner as described in Example 2.

<Acid Treatment Step>

The acid treatment was carried out in the same manner as described in Example 2.

<Alkali Treatment Step>

The alkali treatment was carried out in the same manner as described in Example 2.

<Filtration Step>

The filtration was carried out in the same manner as described in Example 2.

<Drying and Pulverization Step>

The aqueous polymer solution thus filtered was placed in a vacuum oven and dried at a degree of reduced pressure of about 665 N/M² (about 5 mmHg) at an oven temperature of 50° C. for a drying time of 5 hours. The aqueous polymer solution thus dried was pulverized using Victory Mill VP-1 (available from Hosokawa Micron Corp.), thereby obtaining a polyvinylpyrrolidone powder composition having a solid content of 97.3 wt % and an average particle diameter of 234 ηm.

<Evaluation>

The polyvinylpyrrolidone powder composition thus obtained was used as a sample. The content of insoluble substances and the K value lowering ratio were measured and found to be 47 ppm and 14.4%, respectively. The results are shown in Table 1.

Example 5

<Polymerization Step>

The polymerization reaction was carried out in the same manner as described in Example 2.

<Acid Treatment Step>

The acid treatment was carried out in the same manner as described in Example 2.

<Alkali Treatment Step>

The alkali treatment was carried out in the same manner as described in Example 2.

<Antioxidant Addition Step>

The antioxidant was added in the same manner as described in Example 2.

<Drying and Pulverization Step>

The aqueous polymer solution (containing sodium salicylate) thus obtained was placed in a vacuum oven and dried at a degree of reduced pressure of about 665 N/M² (about 5 mmHg) at an oven temperature of 50° C. for a drying time of 5 hours. The aqueous polymer solution thus dried was pulverized using Victory Mill VP-1 (available from Hosokawa Micron Corp.), thereby obtaining a polyvinylpyrrolidone powder composition having a solid content of 97.4 wt % and an average particle diameter of 210 μm.

<Evaluation>

The polyvinylpyrrolidone powder composition thus obtained was used as a sample. The content of insoluble substances and the K value lowering ratio were measured and found to be 82 ppm and 5.2%, respectively. The results are shown in Table 1.

Comparative Example 1>>

<Polymerization Step>

The polymerization reaction was carried out in the same manner as described in Example 1, except that the reactor vessel was charged with 0.03 parts of triethanolamine in place of 0.02 parts of diethanolamine.

<Acid Treatment Step>

The acid treatment was carried out in the same manner as described in Example 1.

<Alkali Treatment Step>

Then, an aqueous alkali solution containing 0.48 parts of triethanolamine, in place of 0.24 parts of diethanolamine, dissolved in 2.7 parts of ion exchanged water was added to adjust the reaction solution to pH 8.2, and the internal temperature was maintained at 90° C. for 30 minutes, thereby obtaining an aqueous polymer solution containing 20 wt % of polyvinylpyrrolidone.

<Drying and Pulverization Step>

The aqueous polymer solution thus obtained was placed in a drum rotary dryer and dried at a drum surface temperature of 140° C. for 20 seconds (drum revolutions, 1.5 rpm). The aqueous polymer solution was pulverized using Victory Mill VP-1 (available from Hosokawa Micron Corp.), thereby obtaining a polyvinylpyrrolidone powder composition having a solid content of 96.8 wt % and an average particle diameter of 220 μm.

<Evaluation>

The polyvinylpyrrolidone powder composition thus obtained was used as a sample. The content of insoluble substances and the K value lowering ratio were measured and found to be 80 ppm and 14.5%, respectively. The results are shown in Table 1.

Comparative Example 2

<Polymerization Step>

The polymerization reaction was carried out in the same manner as described in Example 2.

<Acid Treatment Step>

The acid treatment was carried out in the same manner as described in Example 2.

<Alkali Treatment Step>
The alkali treatment was carried out in the same manner as described in Example 2.
<Drying and Pulverization Step>
The aqueous polymer solution thus obtained was placed in a vacuum oven and dried at a degree of reduced pressure of about 665 N/m² (about 5 mmHg) at an oven temperature of 50° C. for a drying time of 5 hours. The aqueous polymer solution thus dried was pulverized using Victory Mill VP-1 (available from Hosokawa Micron Corp.), thereby obtaining a polyvinylpyrrolidone powder composition having a solid content of 97.2 wt % and an average particle diameter of 241 µm.
<Evaluation>
The polyvinylpyrrolidone powder composition thus obtained was used as a sample. The content of insoluble substances and the K value lowering ratio were measured and found to be 87 ppm and 16.1%, respectively. The results are shown in Table 1.

Reference Examples

Table 1 also shows the measurement data both on the content of insoluble substances and the K value lowering ratio with respect to three polyvinylpyrrolidone powders currently available from other companies as reference examples.

TABLE 1

|  | K values | | | K value lowering ratio (%) | Content of insoluble substances (ppm) |
| --- | --- | --- | --- | --- | --- |
|  | Before heating | After heating 6 days | After heating 14 days | | |
| Example 1 | 77.3 | 75.7 | 73.8 | 4.5 | 33 |
| Example 2 | 77.7 | 74.7 | 73.8 | 5.0 | 40 |
| Example 3 | 78.7 | 76.2 | 74.4 | 5.5 | 35 |
| Example 4 | 78.8 | 72.0 | 67.5 | 14.4 | 47 |
| Example 5 | 79.2 | 76.9 | 75.1 | 5.2 | 82 |
| Comp. Ex. 1 | 84.8 | — | 72.5 | 14.5 | 80 |
| Comp. Ex. 2 | 78.8 | — | 66.1 | 16.1 | 87 |
| Ref. Ex. Product 1 of other company | 85.0 | — | 68.5 | 19.5 | 95 |
| Product 2 of other company | 86.0 | — | 73.6 | 14.4 | 83 |
| Product 3 of other company | 77.0 | — | 65.4 | 15.1 | 131 |

As can be seen from Table 1, the polyvinylpyrrolidone powder composition of Example 1, in which the pH of the polymerization solution was adjusted with a secondary amine, shows small values, in which case the K value lowering ratio was 4.5% and the content of insoluble substances was 33 ppm. Moreover, the polyvinylpyrrolidone powder compositions of Examples 2 and 3 in which an antioxidant was added to the polymerization solution and the filtration operation was then carried out, followed by drying by means of a heating surface adhesion-type drying method using a drum rotary dryer, shows small values, in which cases the K value lowering ratios were 5.0% and 5.5%, and the contents of insoluble substances were 40 ppm and 35 ppm, respectively. Furthermore, the polyvinylpyrrolidone powder composition of Example 4, in which the filtration operation was carried out after completion of the polymerization, followed by drying by means of a heating surface adhesion-type drying method using a drum rotary dryer, shows a high value, in which case the K value lowering ratio was 14.4%, but shows a small value, in which case the content of insoluble substances was 47 ppm. Furthermore, the polyvinylpyrrolidone powder composition of Example 5, in which an antioxidant was added to the polymerization solution, shows a high value, in which case the content of insoluble substances was 82 ppm, but shows a low value, in which case the K value lowering ratio was 5.2%.

In contrast, the polyvinylpyrrolidone powder composition of Comparative Example 1, in which the pH of the polymerization solution was adjusted with a tertiary amine, shows high values, in which case the K value lowering ratio was 14.5% and the content of insoluble substances was 80 ppm. Moreover, the polyvinylpyrrolidone powder composition of Comparative Example 2, in which the antioxidant addition step and the filtration step were omitted from the production steps of Example 2, shows high values, in which case the K value lowering ratio was 16.1% and the content of insoluble substances was 87 ppm. Furthermore, in the Reference Examples, the products 1, 2, and 3 of other companies show high values, in which cases the K value lowering ratios were 19.5%, 14.4%, and 15.1%, and the contents of the insoluble substance were 95 ppm, 83 ppm, and 131 ppm, respectively.

Thus, it can be understood that the execution of the prescribed operations at the time when N-vinylpyrrolidone is polymerized to produce a polyvinylpyrrolidone powder composition make it possible to obtain polyvinylpyrrolidone powder compositions having a small content of insoluble substances and/or fine thermal stability, as compared with polyvinylpyrrolidone powder compositions obtained without carrying out such operations and the currently commercially available polyvinylpyrrolidone powders. Moreover, it can be understood that the same effect as described above cannot be achieved by the use of a tertiary amine in place of a secondary amine.

The polyvinylpyrrolidone powder compositions of the present invention can widely be used as a raw material or an additive in various fields for applications such as cosmetics, intermediates of agricultural and medical products, food additives, photosensitive electronic materials, and tackifiers, or for various special industrial applications (e.g., the production of a hollow fiber membrane or a membrane filter). The polyvinylpyrrolidone powder compositions of the present invention are advantageous from an industrial point of view because they have a high rate of dissolution in water to improve working efficiency at the time of their use and they have fine thermal stability to maintain their quality.

The invention claimed is:

1. A polyvinylpyrrolidone powder composition comprising polyvinylpyrrolidone with a K value of not lower than 50 and not higher than 120,
    wherein a content of insoluble substances remaining on a membrane filter having a pore size of 1.2 μm when a 2 wt % aqueous solution of the composition is filtered with the filter is not higher than 70 ppm, and
    wherein the polyvinylpyrrolidone powder composition is produced by filtering a reaction solution after completion of polymerization and then drying by means of a heating surface adhesion-type drying method, a freeze drying method, or a vacuum drying method,
    wherein the polyvinylpyrrolidone powder composition does not contain a secondary amine or a salt thereof.

2. The polyvinylpyrrolidone powder composition according to claim 1, wherein the average particle diameter of the polyvinylpyrrolidone powder composition is from 10 to 3,000 μm.

3. The polyvinylpyrrolidone powder composition according to claim 1, wherein the drying is carried out by means of the heating surface adhesion-type drying method.

4. The polyvinylpyrrolidone powder composition according to claim 1, wherein the polyvinylpyrrolidone has a K value of not lower than 60 and not higher than 100.

5. The polyvinylpyrrolidone powder composition according to claim 3, wherein the polyvinylpyrrolidone has a K value of not lower than 60 and not higher than 100.

6. The polyvinylpyrrolidone powder composition according to claim 1, wherein the reaction solution after completion of polymerization is filtered with a filter having a pore size of not smaller than 2 μm and not greater than 10 μm.

7. The polyvinylpyrrolidone powder composition according to claim 3, wherein the reaction solution after completion of polymerization is filtered with a filter having a pore size of not smaller than 2 μm and not greater than 10 μm.

* * * * *